(12) United States Patent
Wages et al.

(10) Patent No.: US 12,155,458 B2
(45) Date of Patent: Nov. 26, 2024

(54) SYSTEMS AND METHODS FOR COARSE WAVELENGTH DIVISION MULTIPLEXING PREMISE LEVEL DATA COMMUNICATION

(71) Applicants: Duke Energy Corporation, Charlotte, NC (US); A-PLUS Community Solutions, Inc., Roswell, GA (US)

(72) Inventors: Ronald K. Wages, Waxhaw, NC (US); Larry J. Morrow, Nashville, GA (US)

(73) Assignee: Duke Energy Corporation, A-PLUS Community Solutions, Inc.

( * ) Notice: Subject to any disclaimer, the term of this patent is extended or adjusted under 35 U.S.C. 154(b) by 104 days.

(21) Appl. No.: 18/057,464

(22) Filed: Nov. 21, 2022

(65) Prior Publication Data
US 2023/0216601 A1 Jul. 6, 2023

Related U.S. Application Data

(60) Provisional application No. 63/266,300, filed on Dec. 31, 2021.

(51) Int. Cl.
*H04B 10/00* (2013.01)
*H04J 14/02* (2006.01)
*H04J 14/00* (2006.01)

(52) U.S. Cl.
CPC ...... *H04J 14/0234* (2013.01); *H04J 14/0275* (2013.01)

(58) Field of Classification Search
CPC .. H04J 14/0241; H04J 14/0249; H04J 14/025; H04J 14/0252; H04J 14/0254; H04J 14/0256; H04J 14/0257
See application file for complete search history.

(56) References Cited

U.S. PATENT DOCUMENTS

2020/0083977 A1* 3/2020 Wey .................. H04L 65/1073
2021/0281351 A1* 9/2021 Wey .................. H04J 14/0257

* cited by examiner

*Primary Examiner* — Daniel G Dobson
(74) *Attorney, Agent, or Firm* — WOMBLE BOND DICKINSON (US) LLP

(57) ABSTRACT

Systems, apparatuses, methods, and computer program products are disclosed for managing premise-level data communication in a wavelength division multiplexing (WDM) fiber optic network. An example method includes receiving, by a control system, a message from a new device connected to the WDM fiber optic network, the message including one or more service provider identifiers, a customer identifier, and a customer equipment identifier of the new device. The method further includes transmitting, by the control system, a configuration command to the new device, the configuration command including (i) an indication of which wavelengths the new device may utilize, and (ii) an indication of message types that may be transmitted using each wavelength the new device may utilize. The method further includes causing, by the control system, transmission of a service fee to each service provider associated with a service provider identifier of the one or more service provider identifiers.

20 Claims, 6 Drawing Sheets

SYSTEMS AND METHODS FOR COARSE WAVELENGTH DIVISION MULTIPLEXING PREMISE LEVEL DATA COMMUNICATION

CROSS REFERENCE TO RELATED APPLICATIONS

The present application claims the benefit of U.S. Provisional Application No. 63/266,300, filed Dec. 31, 2021, which is hereby incorporated by reference in its entirety.

TECHNOLOGICAL FIELD

The present disclosure relates in general to the field of electrical power distribution, and more specifically, to systems for blocking and controlling the use of optical carrier signals when deploying wavelength-division multiplexing (WDM) in a fiber optic network.

BACKGROUND

Modern power distribution grids include many generation and transmission resources used to provide power to different types of user loads. Generation and transmission resources may include generators, transmission lines, substations, transformers, etc.

FIG. 1 is a simplified block diagram illustrating an example electrical power distribution environment 100. Referring to FIG. 1, electric power may be generated at a power generation facility 110 for distribution to users 140A-140N that consume the generated electric power. Examples of power generation facilities 110 include facilities which generate electricity from fossil fuels (e.g., coal, petroleum, and/or natural gas), solar energy, geothermal energy, nuclear energy, potential energy (e.g., with a hydroelectric facility), wind energy, and/or chemical energy.

Once generated at the power generation facility 110, the electricity may be delivered to the users 140A-140N via a power distribution grid. The power grid may include, for example, power transmission lines 115 between the power generation facility 110 and one or more substations 120. The electricity may be further transmitted from a given substation 120 to one or more of users 140A-140N over electrical distribution circuits 130, also known as feeders. For example, the electrical distribution circuit 130 may provide electricity to any one of users 140A-140N via a connection between the electrical distribution circuit 130 and the location (e.g., house or building) of the user, such as, for example, at a power meter. The electrical distribution circuits 130 may include, for example, both overhead and underground power lines. Electrical distribution circuits 130 may include additional segmentation. For example, an electrical distribution circuit 130 may include one or more protective devices 135. Protective devices 135 may include, for example, switches, circuit breakers, and/or reclosers.

There are many benefits to combining the legacy power distribution infrastructure with a corresponding fiber optic network, because doing so unlocks many enhancements to the efficiency and effectiveness of power generation, transmission, distribution, and maintenance. To maximize the benefits of such a fiber optic network, multiplexing may be leveraged to provide multiple optical carrier signals on the optical fiber. However, to ensure that some optical carrier signals are only used for sensitive utility-related transmissions, a need exists for controlling how and when different optical carrier signals are deployed by the various devices connected to the fiber optic network.

BRIEF SUMMARY

Coarse wavelength division multiplexing (CWDM) allows up to sixteen wavelengths (often referred to as Lambdas) of light to travel over a single fiber optic strand. Each Lambda is physically independent and has a specific color characteristic within the fiber strand. CWDM Pluggable Optical Transceivers increase network capacity by transmitting multiple data channels using separate optical wavelengths (1470 nm to 1610 nm) on the same fiber pair. These wavelengths are compliant with the ITU G.694 CWDM standard.

Systems, apparatuses, methods, and computer program products are disclosed herein for blocking and controlling the Lambda on the equipment side of the CWDM pluggable Optical transceiver. As described below, each Lambda is assigned and managed on the physical infrastructure equipment. The Lambda used is not visible on the service side of the network.

An example method for providing for managing premise-level data communication in a WDM fiber optic network is disclosed herein. The example method includes receiving, by a control system, a message from a new device connected to the WDM fiber optic network, the message including one or more service provider identifiers, a customer identifier, and a customer equipment identifier of the new device. The method further includes transmitting, by the control system, a configuration command to the new device, the configuration command including (i) an indication of which wavelengths the new device may utilize, and (ii) an indication of message types that may be transmitted using each wavelength the new device may utilize. The method further includes causing, by the control system, transmission of a service fee to each service provider associated with a service provider identifier of the one or more service provider identifiers.

In one example embodiment, an apparatus is provided for managing premise-level data communication in a WDM fiber optic network. The example apparatus includes a processor and a memory storing software instructions that, when executed by the processor, cause the apparatus to receive a message from a new device connected to the WDM fiber optic network, the message including one or more service provider identifiers, a customer identifier, and a customer equipment identifier of the new device. The processor and a memory storing software instructions that, when executed by the processor, further cause the apparatus to transmit a configuration command to the new device, the configuration command including (i) an indication of which wavelengths the new device may utilize, and (ii) an indication of message types that may be transmitted using each wavelength the new device may utilize. The processor and a memory storing software instructions that, when executed by the processor, further cause the apparatus to cause transmission of a service fee to each service provider associated with a service provider identifier of the one or more service provider identifiers.

In one example embodiment, a computer program product is provided for managing premise-level data communication in a WDM fiber optic network. The computer program product includes at least one non-transitory computer-readable storage medium storing software instructions that, when executed by an apparatus, cause the apparatus to receive a message from a new device connected to the WDM fiber optic network, the message including one or more service provider identifiers, a customer identifier, and a customer equipment identifier of the new device. The at least one non-transitory computer-readable storage medium storing software instructions that, when executed by an apparatus, further cause the apparatus to transmit a configuration command to the new device, the configuration command including (i) an indication of which wavelengths the new device may utilize, and (ii) an indication of message types that may be transmitted using each wavelength the new device may utilize. The at least one non-transitory computer-readable storage medium storing software instructions that, when executed by an apparatus, further cause the apparatus to cause transmission of a service fee to each service provider associated with a service provider identifier of the one or more service provider identifiers.

The foregoing brief summary is provided merely for purposes of summarizing some example embodiments described herein. Because the above-described embodiments are merely examples, they should not be construed to narrow the scope of this disclosure in any way. It will be appreciated that the scope of the present disclosure encompasses many potential embodiments in addition to those summarized above, some of which will be described in further detail below.

BRIEF DESCRIPTION OF THE FIGURES

Having described certain example embodiments in general terms above, reference will now be made to the accompanying drawings, which are not necessarily drawn to scale. Some embodiments may include fewer or more components than those shown in the figures.

DETAILED DESCRIPTION

Figure 1:
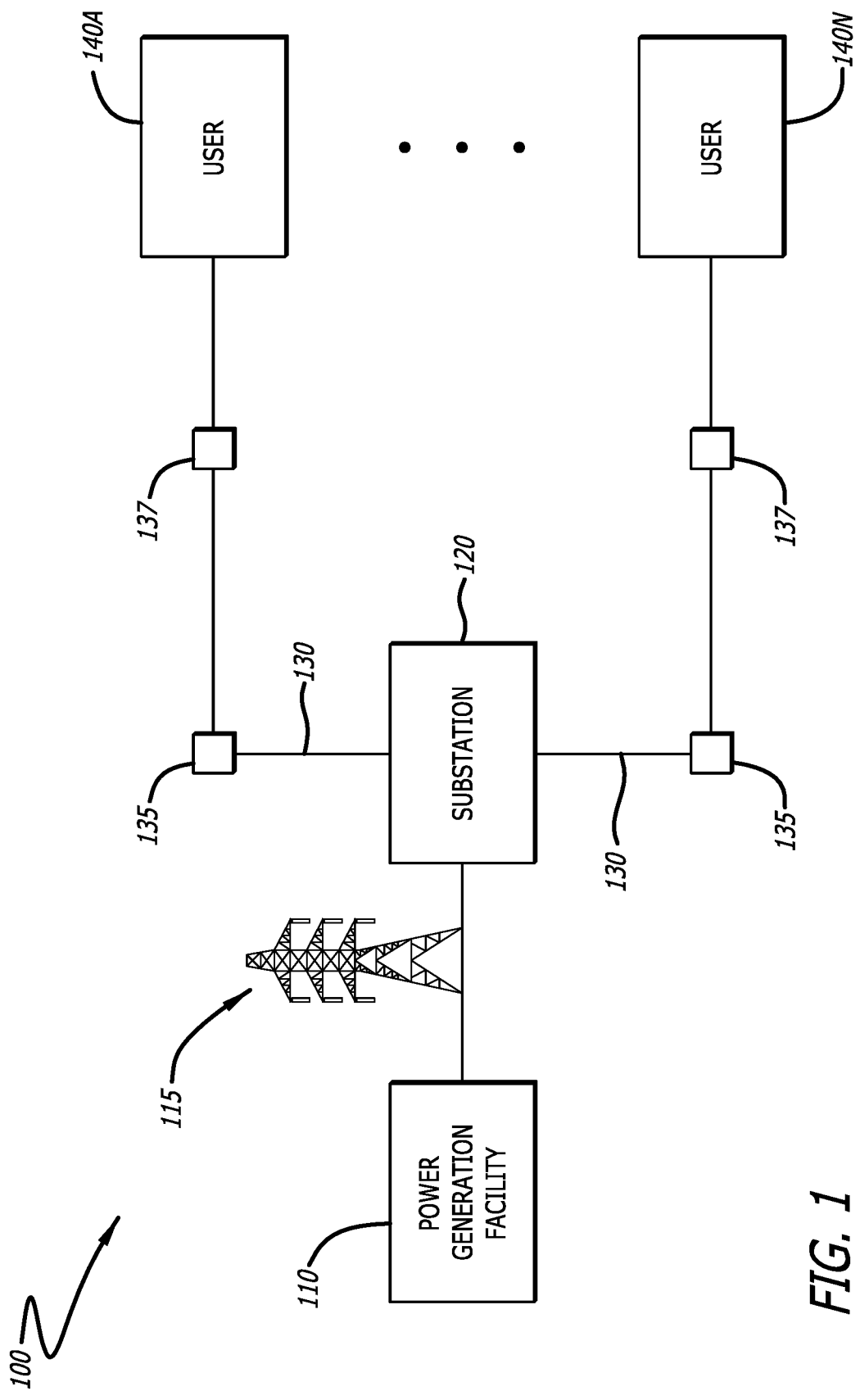
FIG. 1 illustrates a simplified block diagram illustrating an example electrical power distribution environment.

Some example embodiments will now be described more fully hereinafter with reference to the accompanying figures, in which some, but not necessarily all, embodiments are shown. Because inventions described herein may be embodied in many different forms, the invention should not be limited solely to the embodiments set forth herein; rather, these embodiments are provided so that this disclosure will satisfy applicable legal requirements.

Many modifications and other embodiments of the disclosure set forth herein will come to mind to one skilled in the art to which this disclosure pertains having the benefit of the teachings presented in the foregoing description and the associated drawings. Therefore, it is to be understood that the embodiments are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly describe herein are also contemplated as may be set forth in some of the appended claims. Although specific terms are employed herein, they are used in a generic and descriptive sense only and not for purposes of limitation.

The terms "data," "content," "information," "electronic information," "signal," "command," and similar terms may be used interchangeably to refer to data capable of being transmitted, received, and/or stored in accordance with embodiments of the present invention. Thus, use of any such terms should not be taken to limit the spirit or scope of embodiments of the present invention. Further, where a first computing device is described herein to receive data from a second computing device, it will be appreciated that the data may be received directly from the second computing device or may be received indirectly via one or more intermediary computing devices, such as, for example, one or more servers, relays, routers, network access points, base stations, hosts, and/or the like, sometimes referred to herein as a "network." Similarly, where a first computing device is described herein as sending data to a second computing device, it will be appreciated that the data may be sent directly to the second computing device or may be sent indirectly via one or more intermediary computing devices, such as, for example, one or more servers, remote servers, cloud-based servers (e.g., cloud utilities), relays, routers, network access points, base stations, hosts, and/or the like.

The terms "comprising" means including but not limited to, and should be interpreted in the manner it is typically used in the patent context. Use of broader terms such as comprises, includes, and having should be understood to provide support for narrower terms such as consisting of, consisting essentially of, and comprised substantially of.

The terms "in one embodiment," "according to one embodiment," "in some embodiments," and the like generally may refer to the fact that the particular feature, structure, or characteristic following the phrase may be included in at least one embodiment of the present invention. Thus, the particular feature, structure, or characteristic may be included in more than one embodiment of the present invention such that these phrases do not necessarily refer to the same embodiment.

The term "example" is used herein to mean "serving as an example, instance, or illustration." Any implementation described herein as "example" is not necessarily to be construed as preferred or advantageous over other implementations.

The terms "computer-readable medium" and "memory" refer to non-transitory storage hardware, non-transitory storage device or non-transitory computer system memory that may store computer-executable instructions or software programs that may be accessed by a controller, a microcontroller, a computational system or a module of a computational system. A non-transitory computer-readable medium may be accessed by a computational system or a module of a computational system to retrieve and/or execute the computer-executable instructions or software programs stored on the medium. Exemplary non-transitory computer-readable media may include, but are not limited to, one or more types of hardware memory, non-transitory tangible media (for example, one or more magnetic storage disks, one or more optical disks, one or more USB flash drives), computer system memory or random access memory (such as, DRAM, SRAM, EDO RAM), and the like.

The term "computing device" may refer to any computer embodied in hardware, software, firmware, and/or any combination thereof. Non-limiting examples of computing devices include a personal computer, a server, a laptop, a mobile device, a smartphone, a fixed terminal, a personal digital assistant ("PDA"), a kiosk, a custom-hardware device, a wearable device, a smart home device, an Internet-of-Things ("IoT") enabled device, and a network-linked computing device.

The term "control system" is used herein to refer to any one or all of programmable logic controllers (PLCs), programmable automation controllers (PACs), industrial computers, desktop computers, personal data assistants (PDAs), laptop computers, tablet computers, smart books, palm-top computers, personal computers, smartphones, server devices, and similar electronic devices equipped with at least a processor and any other physical components necessary to perform the various operations described herein.

The term "fiber optic network" is used herein to refer to a communication network which includes one or more optical fiber cables, which may be used facilitate the transfer of a signal (e.g., telemetry data) between respective terminals (e.g., a starting node or optical line terminal (OLT) and a terminating node or optical network terminal (ONT)). At least a portion of each optical fiber cable may further be disposed within a cable jacket, which may serve to protect the optical fiber cable from environmental conditions and ensure long-term durability. Additionally, the cable jacket may minimize attenuation of carried signals due to microbleeding. In some embodiments, the fiber optic network is a passive optical network (PON). A PON may use one or more fiber optic splitters to divide individual optical fiber cables among two or more ONTs, thus reducing the number of fiber optic cables needed for connectivity and the number of active devices requiring electrical power. A PON may utilize wavelength-division multiplexing (e.g., coarse wavelength division multiplexing (CWDM or dense wavelength division multiplexing (DWDM)) to permit bidirectional communications and/or a multiplication of capacity of the fiber optic network. In some embodiments, downstream signals provided by an ONT are received by all ONTs. In some embodiments, these downstream signals are encrypted using any suitable technique to prevent eavesdropping. In some embodiments, the fiber optic terminals may correspond to terminals at a central office (CO) or head end (HE) facility and customer premise equipment (CPE) at a corresponding customer location, residential government, or commercial location.

The term "telemetry data" is used here to refer to data collected by various devices within the power distribution environment and transmitted via the fiber optic network. For example, the telemetry data may be collected by smart meters at a customer premises, transformers, down-line reclosers, and distributed power generation facilities, and/or the like. Telemetry data may be transmitted via the fiber optic network in sub-millisecond intervals. In some embodiments, the telemetry data may be encrypted using an encryption key. The encryption key may be a symmetric encryption key which is shared between two or more active devices or other devices within the fiber optic network. The encryption key may correspond to a symmetric key algorithm, such as advanced encryption standard (AES), Blowfish, data encryption standard (DES), and/or the like.

Overview

Example embodiments described herein rely upon an enhanced electrical power distribution environment leveraging the use of a corresponding fiber optic network that permits near-real-time exchange of information between entities in the environment. Introduction of a fiber optic network, however, brings new opportunities and a greater need for tools to manage optical transmissions. For instance, multiplexing may be leveraged within the fiber optic network to provide multiple optical carrier signals on the optical fiber that may be used for various purposes.

Figure 2A:
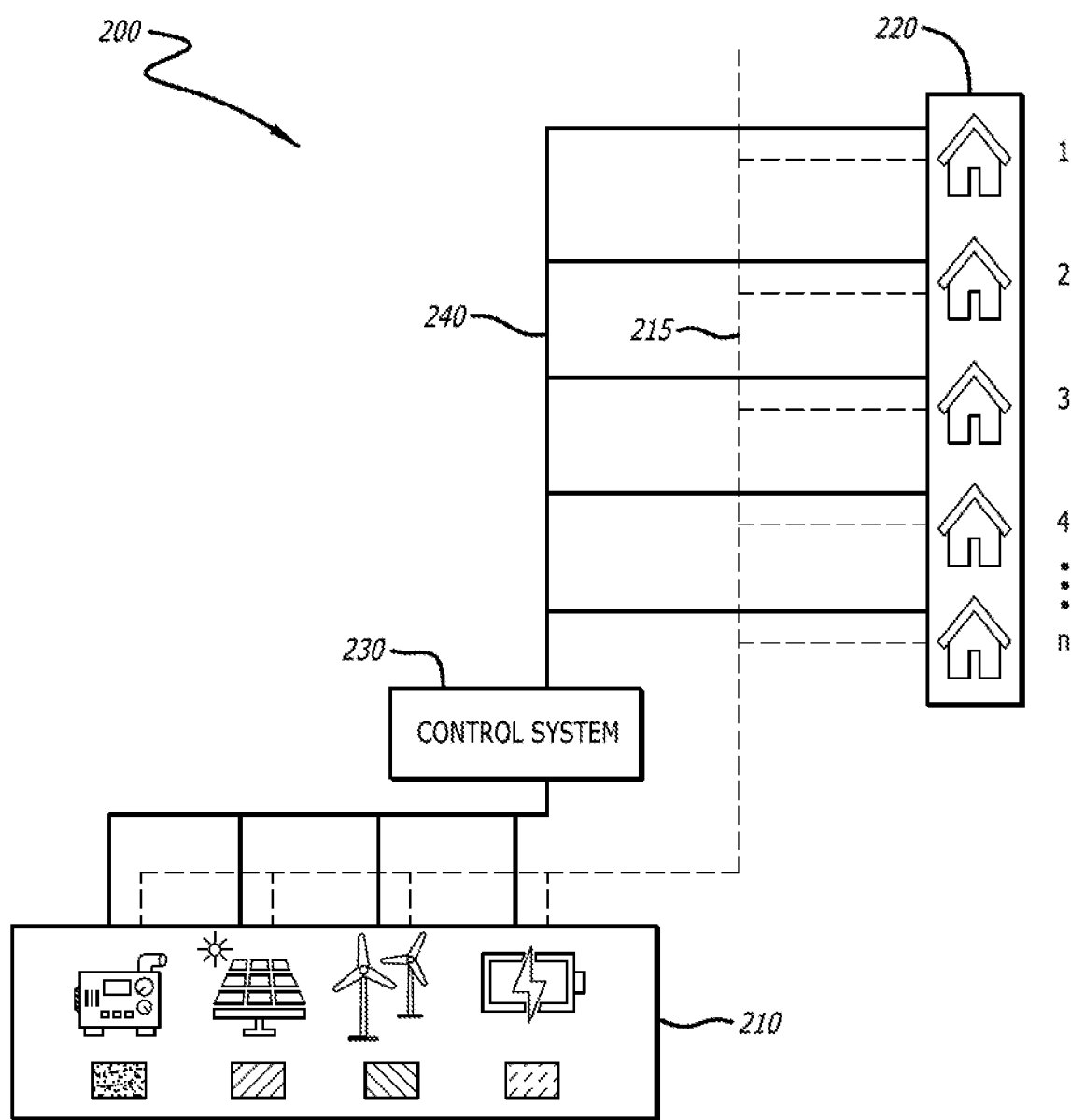
FIG. 2A illustrates a simplified block diagram of an example electrical power distribution environment and corresponding fiber optic network, in accordance with some example embodiments described herein.

FIG. 2A illustrates a simplified block diagram of an example electrical power distribution environment 200 enhanced by a corresponding fiber optic network, in accordance with some example embodiments described herein. FIG. 2A illustrates a series of power generating facilities 210 (which may comprise facilities that generate electricity from fossil fuels, solar energy, geothermal energy, nuclear energy, potential energy (e.g., with a hydroelectric facility), wind energy, and/or chemical energy) that may be provide power to a series of users 220 via a distribution network 215. While power generation facilitates 110 are traditionally located in fixed locations within an environment remote from heavily populated areas and connected to the rest of the environment via transmission lines, many renewable power generation facilitates (e.g., wind, solar, fuel-based generators, and battery enclaves) may be distributed throughout the environment. In addition, however, FIG. 2A illustrates a control system 230 that may exchange information with the power generating facilities 210 and the users 220 via a fiber optic network 240. Various components of the control system 230 are described in greater detail below in connection with FIG. 3. The fiber optic network 240 may connect to just the endpoints in the electrical power distribution environment 200 or may connect to all entities (including transformers, switches, circuit breakers, reclosers, etc.) in the electrical power distribution environment 200.

Optical fiber cables within the fiber optic network 240 may be used facilitate the transfer of a signal (e.g., telemetry data) between respective terminals (e.g., between OLT and ONTs). At least a portion of each optical fiber cable may further be disposed within a cable jacket, which may serve to protect the optical fiber cable from environmental conditions and ensure long-term durability. Additionally, the cable jacket may minimize attenuation of carried signals due to microbleeding. Connection of the fiber optic network to the various entities in the electrical power distribution environment 200 enables near-real-time communication between any two entities in the environment with any other entity.

The fiber optic network 240 may comprise a PON to reduce the number of fiber optic strands needed for connectivity and the number of active devices requiring electrical power, and may utilize wavelength-division multiplexing (e.g., CWDM or DWDM) to permit bidirectional communications and/or a multiplication of capacity of the fiber optic network. A PON may use one or more fiber optic splitters to divide individual optical fiber cables among two or more ONTs, thus reducing the number of fiber optic cables needed for connectivity and the number of active devices requiring electrical power. In some embodiments, downstream signals provided by an OLT are received by all ONTs. In some embodiments, the fiber optic terminals may correspond to terminals at the CO or HE located at a facility and/or CPE at the customer location, residential government, or commercial location. In some embodiments, the terminals at the CO or HE may serve as the OLT and terminals at the CPE may serve as the ONT. Alternatively, terminals at the CPE may serve as the OLT and terminals at the CO or HE may serve as the ONT.

The control system 230 leverages the existence of the fiber optic network 240 to receive telemetry data (e.g., small data packets transmitted in sub-millisecond intervals) from various devices in the electrical power distribution environment 200. From this telemetry data, the control system may calculate various results that may be beneficially used for management of the electrical power distribution environment 200.

Figure 2B:
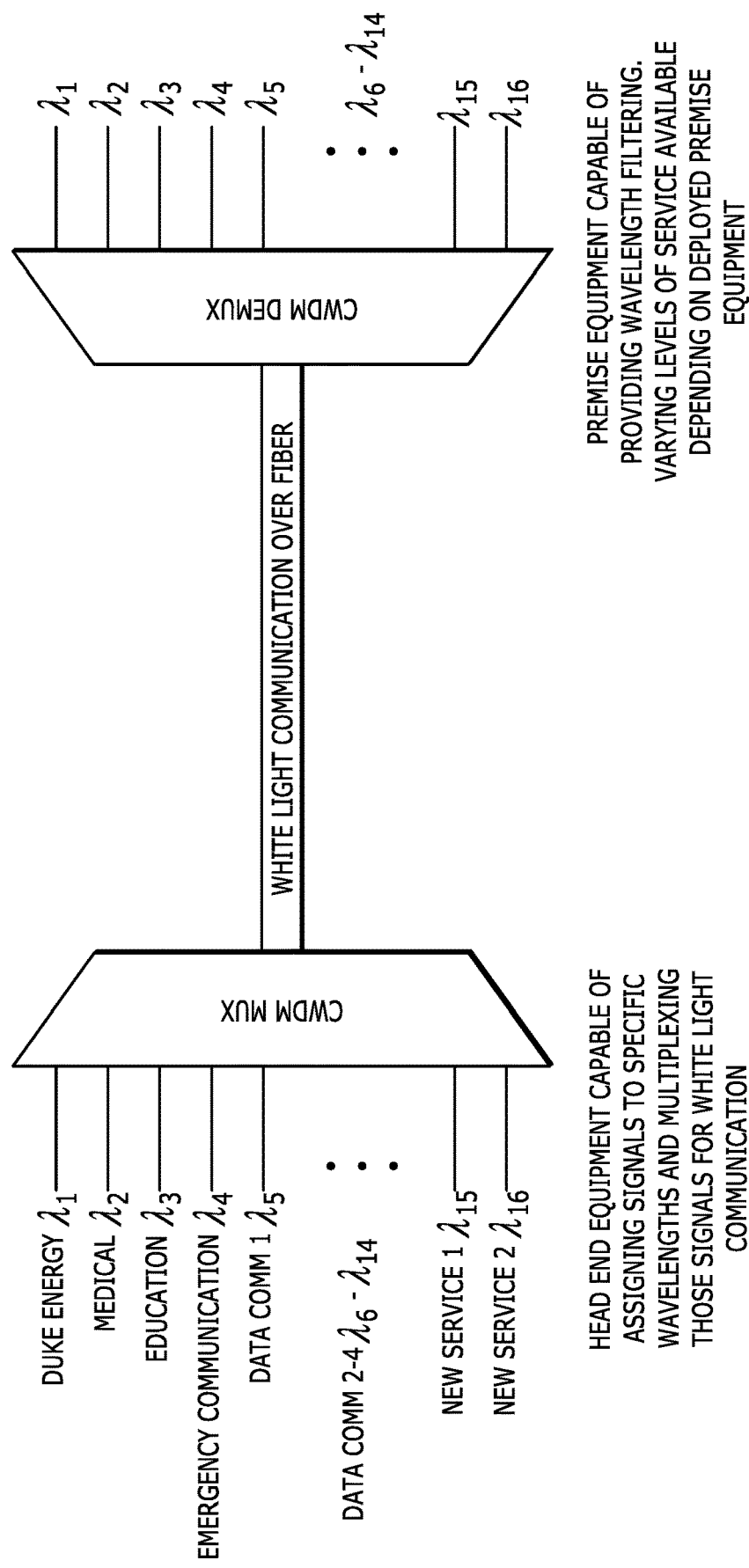
FIG. 2B illustrates a diagram of an example set of wavelength assignments that may be utilized in accordance with some example embodiments described herein.

However, to ensure that some optical carrier signals are only used for sensitive utility-related transmissions and to properly manage utilization of those optical carrier signals and others, a need exists for controlling how and when different optical carrier signals are deployed by the various devices connected to the fiber optic network. Example embodiments address these issues by assigning the various available bands used in the fiber optic network to corresponding types of transmissions. As shown in FIG. 2B, there are as many as 16 lambdas (e.g., wavelengths) in a CWDM system. One of the sixteen CWDM Lambdas may be reserved as an out-of-band control channel. Three Lambdas may be reserved for high availability utility and government uses. One Lambda may be dedicated as a spare, leaving the remaining Lambdas available for use by service providers of various types. FIG. 2B illustrates one example deployment, in which the first Lambda is reserved for Duke Energy, the second, for medical uses, the third for educational uses, the fourth for emergency uses, and the fifth as a reserved channel. Bands 6-16 may then be used by partnering commercial service providers.

Example embodiments deploy a method of tagging each port at the customer premise side of the network during installation. Each port tag may contain four primary identifying elements: (i) a service provider identifier; (ii) a customer identifier; (iii) a customer equipment identifier; and (iv) an Optical Tele-Toll (OT-T) identifier port. Provisioning occurs on a per physical subscriber interface port and a physical OT-T optical switch port.

The service provider identifier may correspond to the assigned service provider for the particular port. The service provider identifier may uniquely identify one service provider from other service providers. The customer identifier may uniquely identify the premise and/or customer associated with the device. The customer equipment identifier may be automatically assigned to the active device by the device manufacturer and hard-coded into the active device's network interface card (NIC).

Customer Premise Equipment (CPE) can be CWDM ports, single wave ports, or Gigabit Ethernet passive optical network (GPON) enabled fiber ports.

An operational support system (OSS), which may, for instance, be hosted by the control system 230, maintains the pairing from the OT-T to the CPE as long as the subscriber buys service from a provider. Accordingly, even if the assignment of Lambdas may change across the network, the subscriber and the provider pairing will remain unchanged. Furthermore, in the event that a service provider for the CPE changes (e.g., service added, service dropped, etc.), the OSS may update the pairing such that the appropriate service provider from the OT-T to the subscriber CPE are paired.

The OT-T may be hosted by the control system 230 and located at the head end or primary data center, and may assign Lambdas and sends configuration commands to each CPE that physically connects to the fiber optic network. Moreover, optical signals connect to the service provider's equipment only at the OT-T.

Using this design, example implementations contemplated herein unlock many new possibilities building upon the deployment of an electrical power distribution environment 200 that includes a power distribution grid and a corresponding fiber optic network. For instance, current broadband strategies require a provider to own, operate, and provide service to every user. By deploying a WDM fiber optic network alongside the power distribution grid that already connects to each customer premise, a utility can have 16 different services on the same fiber, allowing cost sharing of the infrastructure. For instance, the utility provider may, via the OT-T, charge a monthly service fee per customer from various service providers that seek to use the fiber optic network to engage with the CPE. At the same time, the utility may concurrently provide data communications to intelligent meters (on one of the channels). The single intelligent meter communication may also act as an excellent data communications infrastructure for energy markets (e.g., the Southeast Energy Exchange Market (SEEM)). Since a utility may deploy the fiber for intelligent meter communication, it does not have to stop at the curb and have individual customer permission to connect to the premise. Moreover, leveraging the economies of scale of a utility having millions of customers, larger scale deployment may be done at a cost that is lower per-premise. Another unaccounted value of example embodiments is the availability of reliable near-real-time communication with meters without the reliance on lower performing mesh communication schemes.

Although a high level explanation of the operations of example embodiments has been provided above, specific details regarding the configuration of such example embodiments are provided below.

Example Implementing Apparatuses

Figure 3:
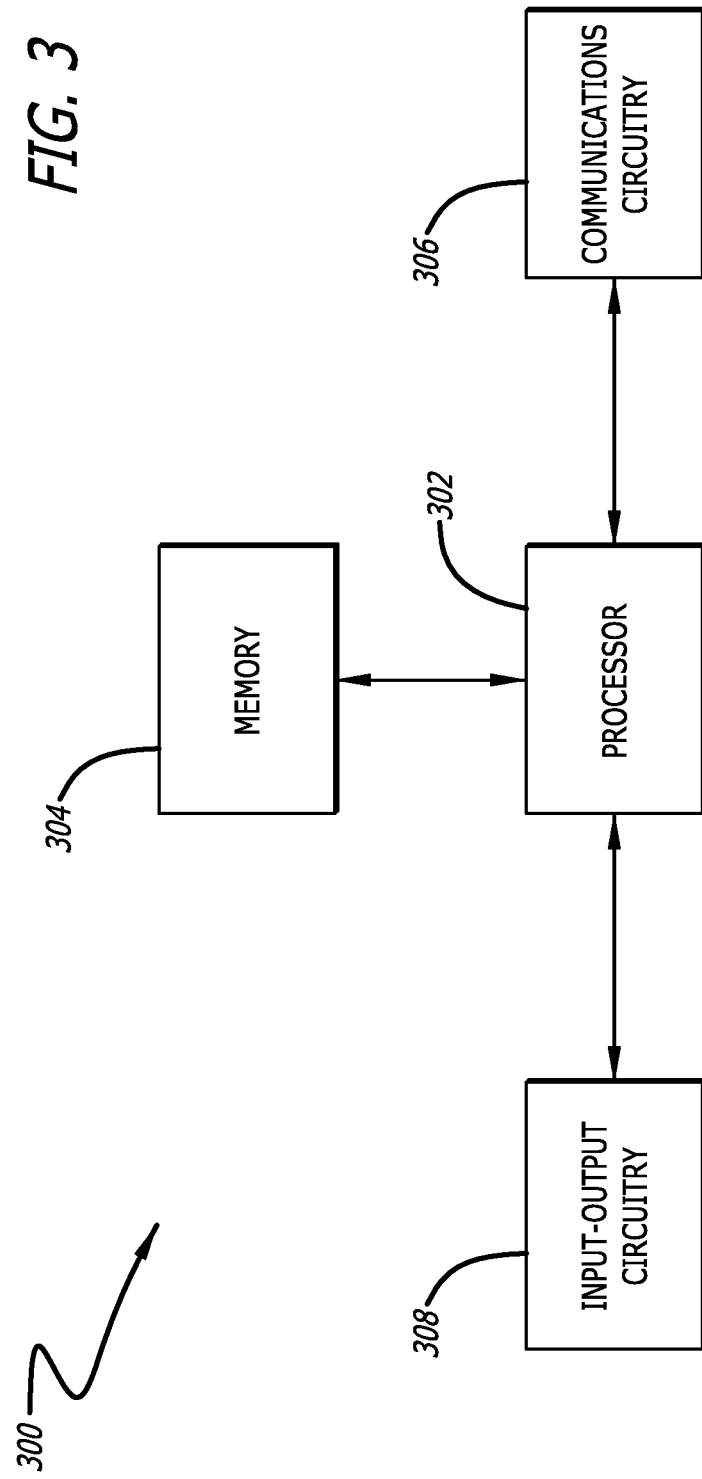
FIG. 3 illustrates a schematic block diagram of example circuitry embodying a device that may perform various operations in accordance with example embodiments described herein.

FIG. 3 illustrates an apparatus 300 that may comprise an example control system 230 that may implement example embodiments described herein. The apparatus may include processor 302, memory 304, communications circuitry 306, and input-output circuitry 308, each of which will be described in greater detail below, along with and any number of additional hardware components not expressly shown in FIG. 3. While the various components are only illustrated in FIG. 3 as being connected with processor 302, it will be understood that the apparatus 300 may further comprises a bus (not expressly shown in FIG. 3) for passing information amongst any combination of the various components of the apparatus 300. The apparatus 300 may be configured to execute various operations described above, as well as those described below in connection with FIG. 3.

The processor 302 (and/or co-processor or any other processor assisting or otherwise associated with the processor) may be in communication with the memory 304 via a bus for passing information amongst components of the apparatus. The processor 302 may be embodied in a number of different ways and may, for example, include one or more processing devices configured to perform independently. Furthermore, the processor may include one or more processors configured in tandem via a bus to enable independent execution of software instructions, pipelining, and/or multithreading. The use of the term "processor" may be understood to include a single core processor, a multi-core processor, multiple processors of the apparatus 300, remote or "cloud" processors, or any combination thereof.

The processor 302 may be configured to execute software instructions stored in the memory 304 or otherwise accessible to the processor (e.g., software instructions stored on a separate storage device). In some cases, the processor may be configured to execute hard-coded functionality. As such, whether configured by hardware or software methods, or by a combination of hardware with software, the processor 302 represent an entity (e.g., physically embodied in circuitry) capable of performing operations according to various embodiments of the present invention while configured accordingly. Alternatively, as another example, when the processor 302 is embodied as an executor of software instructions, the software instructions may specifically configure the processor 302 to perform the algorithms and/or operations described herein when the software instructions are executed.

Memory 304 is non-transitory and may include, for example, one or more volatile and/or non-volatile memories. In other words, for example, the memory 304 may be an electronic storage device (e.g., a computer readable storage medium). The memory 304 may be configured to store information, data, content, applications, software instructions, or the like, for enabling the apparatus to carry out various functions in accordance with example embodiments contemplated herein.

The communications circuitry 306 may be any means such as a device or circuitry embodied in either hardware or a combination of hardware and software that is configured to receive and/or transmit data from/to a network and/or any other device, circuitry, or module in communication with the apparatus 300. In this regard, the communications circuitry 306 may include, for example, a network interface for enabling communications with a wired or wireless communication network. For example, the communications circuitry 306 may include one or more network interface cards, antennas, buses, switches, routers, modems, and supporting hardware and/or software, or any other device suitable for enabling communications via a network. Furthermore, the communications circuitry 306 may include the processing circuitry for causing transmission of such signals to a network or for handling receipt of signals received from a network.

The apparatus 300 may include input-output circuitry 308 configured to provide output to a user and, in some embodiments, to receive an indication of user input. It will be noted that some embodiments will not include input-output circuitry 308, in which case user input may be received via a separate device. The input-output circuitry 308 may comprise a user interface, such as a display, and may further comprise the components that govern use of the user interface, such as a web browser, mobile application, dedicated client device, or the like. In some embodiments, the input-output circuitry 308 may include a keyboard, a mouse, a touch screen, touch areas, soft keys, a microphone, a speaker, and/or other input/output mechanisms. The input-output circuitry 308 may utilize the processor 302 to control one or more functions of one or more of these user interface elements through software instructions (e.g., application software and/or system software, such as firmware) stored on a memory (e.g., memory 304) accessible to the processor 302.

In some embodiments, various components of the apparatus 300 may be hosted remotely (e.g., by one or more cloud servers) and thus not all components must reside in one physical location. Moreover, some of the functionality described herein may be provided by third party circuitry. For example, apparatus 300 may access one or more third party circuitries via any sort of networked connection that facilitates transmission of data and electronic information between the apparatus 300 and the third party circuitries. In turn, the apparatus 300 may be in remote communication with one or more of the components describe above as comprising the apparatus 300.

As will be appreciated based on this disclosure, some example embodiments may take the form of a computer program product comprising software instructions stored on at least one non-transitory computer-readable storage medium (e.g., memory 304). Any suitable non-transitory computer-readable storage medium may be utilized in such embodiments, some examples of which are non-transitory hard disks, CD-ROMs, flash memory, optical storage devices, and magnetic storage devices. It should be appreciated, with respect to certain devices embodied by apparatus 300 as described in FIG. 3, that loading the software instructions onto a computing device or apparatus produces a special-purpose machine comprising the means for implementing various functions described herein.

Having described specific components of the apparatus 300, example embodiments are described below.

Example Operations

Figure 4:
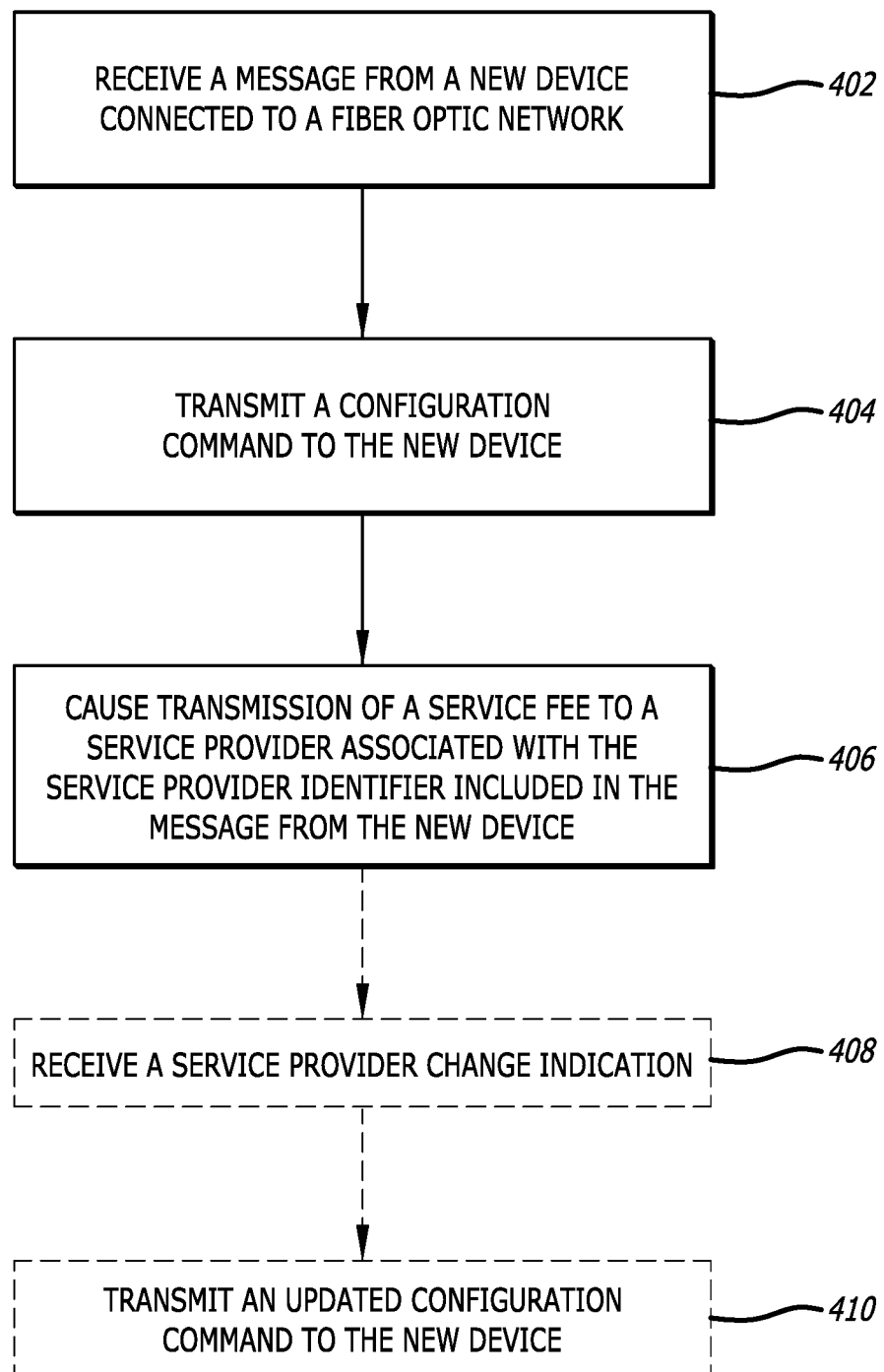
FIG. 4 illustrates an example flowchart for managing premise-level data communication in a WDM fiber optic network, in accordance with some example embodiments described herein.

Turning to FIG. 4, an example flowchart is illustrated that contains example operations implemented by various embodiments contemplated herein. The operations illustrated in FIG. 4 may, for example, be performed by an apparatus 300, which is shown and described in connection with FIG. 3. To perform the operations described below, the apparatus 300 may utilize one or more of processor 302, memory 304, communications circuitry 306, input-output circuitry 308, other components, and/or any combination thereof. It will be understood that user interaction with the apparatus 300 may occur directly via input-output circuitry 308, or may instead be facilitated by a device that in turn interacts with apparatus 300.

As shown by operation 402, the apparatus 300 includes means, such as processor 302, memory 304, communications circuitry 306, input-output circuitry 308, or the like, for receiving a message from a new device connected to a fiber optic network. The message may include a service provider identifier, a customer identifier, and a customer equipment identifier of the new device. In some embodiments, the message may be received during an initialization of the device into the fiber optic network. In some embodiments, the message may be received when a CPE device terminates ones or more current service providers and/or adds one or more service providers.

The apparatus 300 may pair an OT-T port to a CPE port based on the message and may maintain the pairing as long as the service provider pays associated service fees. In some embodiments, apparatus 300 may assign a port tag for each port of the new device based on the message. In particular, the apparatus 300 may generate a port tag for each port and assign the port tag to a particular port of the device. In some embodiments, the apparatus 300 may determine the number of ports the device is configured with based on the customer equipment identifier. For example, the apparatus 300 may be configured with a reference table indicative of the number of ports for various types of customer equipment, which may be indicated by at least a portion of the customer equipment identifier (e.g., the first 10 characters). Each port tag may describe: (i) a service provider identifier; (ii) a customer identifier; (iii) a customer equipment identifier; and (iv) an Optical Tele-Toll (OT-T) identifier port.

As shown by operation 404, the apparatus 300 includes means, such as processor 302, memory 304, communications circuitry 306, input-output circuitry 308, or the like, for transmitting a configuration command to the new device. The configuration command may include (i) an indication of which wavelengths the new device may utilize, and (ii) an indication of message types that may be transmitted using each wavelength the new device may utilize. The configuration command may be generated by apparatus 300 based on the OT-T and CPE device pairing and/or the port tags.

In some embodiments, the configuration command may be indicative of up to sixteen wavelengths the new device may utilize. In some embodiments, the configuration command is indicative of: a wavelength that corresponds to an out-of-band control channel, up to three wavelengths that each correspond to a utility or government channel, a wavelength that corresponds to an emergency channel, a wavelength that corresponds to a spare channel, and up to eleven wavelengths that each correspond to a commercial service provider channel.

As shown by operation 406, the apparatus 300 includes means, such as processor 302, memory 304, communications circuitry 306, input-output circuitry 308, or the like, for causing transmission of a service fee to each service provider associated with a service provider identifier of the one or more service provider identifiers. Apparatus 300 may calculate a service fee based on one or more service configuration parameters associated with the service provider. For example, the one or more service configuration parameters may be indicative of a flat-fee, a usage fee, etc. As such, the apparatus 300 may use the one or more service configuration parameter and service provider utilization metrics to determine the service fee.

If the service provider pays the service fee, the apparatus 300 may maintain the pairing between the OT-T and CPE. If the service provider fails to pay the service fee after a particular duration of time (e.g., after one month), the apparatus 300 may terminate the pairing between the OT-T and CPE.

As shown by operation 408, the apparatus 300 includes means, such as processor 302, memory 304, communications circuitry 306, input-output circuitry 308, or the like, for receiving a service provider change indication. In some embodiments, the apparatus 300 may receive the service provider change indication from the CPE device and/or from a service provider device. The service provider change indication may be indicative of a change in service providers for the device. For example, the service provider change indication may indicate a service addition or termination for the device.

Apparatus 300 may identify one or more ports of the device that are affected by the service provider change indication. The updated ports may be the ports currently paired to an OT-T port associated with a terminated service provider and/or unassigned port. Apparatus 300 may update the port tag for each affected port tag and update the pairing of the OT-T port and CPE port such that a new service provider is paired with the CPE device and/or a terminated service provider is no longer paired with the CPE device.

As shown by operation 410, the apparatus 300 includes means, such as processor 302, memory 304, communications circuitry 306, input-output circuitry 308, or the like, transmitting an updated configuration command to the new device. The updated configuration command may include an updated indication of message types that may be transmitted using each wavelength the new device may utilize. The updated indication of message types that may be transmitted using each wavelength the CPE device may utilize may reflect the change in service providers and corresponding OT-T port and CPE port pairings.

FIG. 4 illustrates operations performed by apparatuses, methods, and computer program products according to various example embodiments. It will be understood that each flowchart block, and each combination of flowchart blocks, may be implemented by various means, embodied as hardware, firmware, circuitry, and/or other devices associated with execution of software including one or more software instructions. For example, one or more of the operations described above may be embodied by software instructions. In this regard, the software instructions which embody the procedures described above may be stored by a memory of an apparatus employing an embodiment of the present invention and executed by a processor of that apparatus. As will be appreciated, any such software instructions may be loaded onto a computing device or other programmable apparatus (e.g., hardware) to produce a machine, such that the resulting computing device or other programmable apparatus implements the functions specified in the flowchart blocks. These software instructions may also be stored in a computer-readable memory that may direct a computing device or other programmable apparatus to function in a particular manner, such that the software instructions stored in the computer-readable memory produce an article of manufacture, the execution of which implements the functions specified in the flowchart blocks. The software instructions may also be loaded onto a computing device or other programmable apparatus to cause a series of operations to be performed on the computing device or other programmable apparatus to produce a computer-implemented process such that the software instructions executed on the computing device or other programmable apparatus provide operations for implementing the functions specified in the flowchart blocks.

The flowchart blocks support combinations of means for performing the specified functions and combinations of operations for performing the specified functions. It will be understood that individual flowchart blocks, and/or combinations of flowchart blocks, can be implemented by special purpose hardware-based computing devices which perform the specified functions, or combinations of special purpose hardware and software instructions.

In some embodiments, some of the operations above may be modified or further amplified. Furthermore, in some embodiments, additional optional operations may be included. Modifications, amplifications, or additions to the operations above may be performed in any order and in any combination.

Example System Operations

Figure 5:
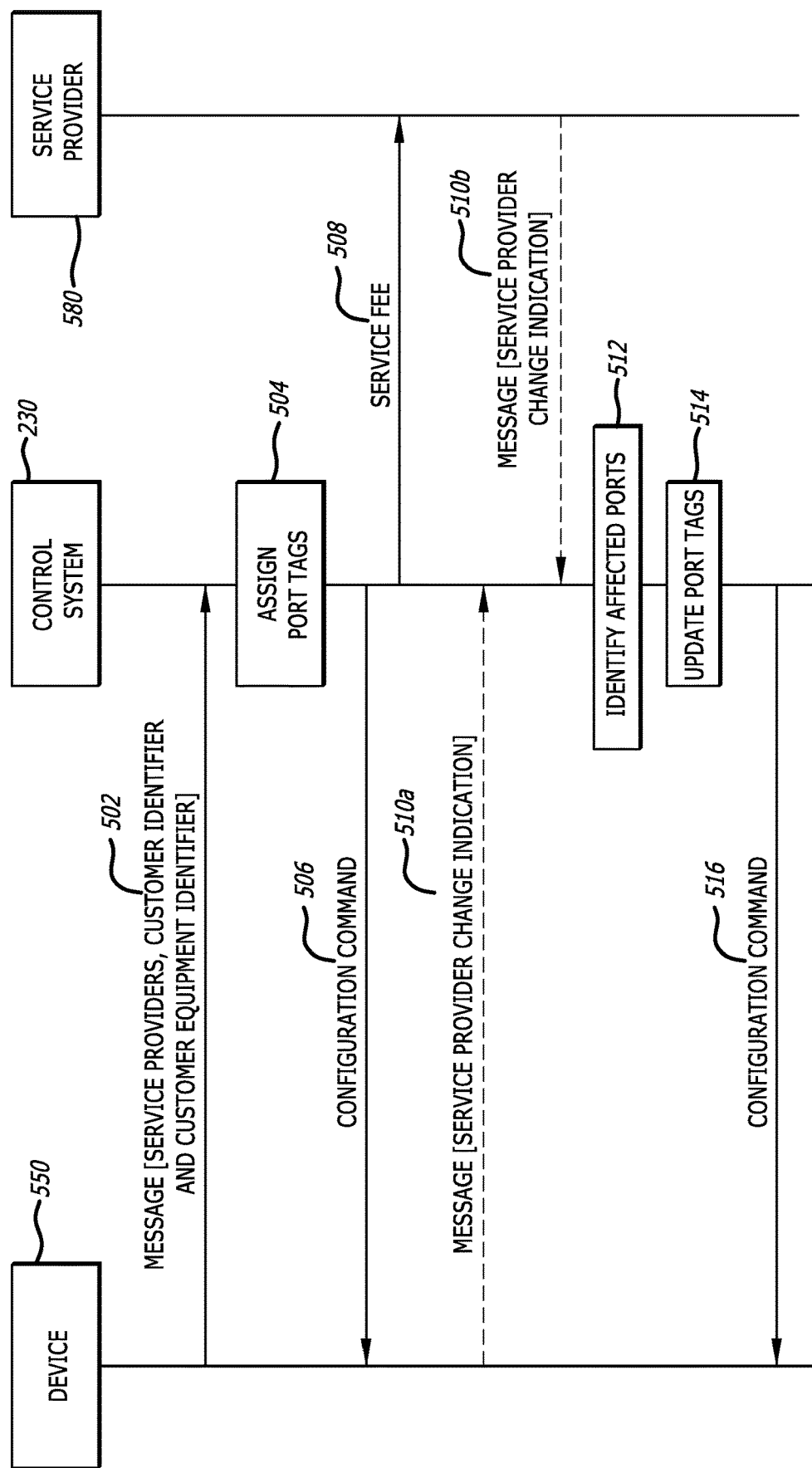
FIG. 5 illustrates a swim lane diagram of operations for an example process for managing premise-level data communication in a WDM fiber optic network, in accordance with some example embodiments described herein.

FIG. 5 shows a swim lane diagram illustrating example operations (e.g., as described above in connection with FIG. 4) performed by components of the environment depicted in FIGS. 2A-2B to produce various benefits from example embodiments. In these figures, operations performed by a control system 230 are shown along the vertical line extending from the element labeled "control system", operations performed by CPE device 550 are shown along the vertical line extending from the element labeled "device", and operations performed by a service provider device are shown along the vertical line extending from the element labeled "service provider." Operations impacting both devices, such as data transmissions between the devices, are shown using arrows extending between these lines. Generally, the operations are ordered temporally with respect to one another. However, it will be appreciated that the operations may be performed in other orders from those illustrated herein.

At operation 502, a control system 230 may receive a message from device 550 indicating one or more service provider identifiers, a customer identifier, and a customer equipment identifier. At operation 504, control system 230 may assign port tags based on the message. At operation 506, control system 230 may transmit a configuration command to device 550. The configuration command may include an indication of which wavelengths the device may utilize, and an indication of message types that may be transmitted using each wavelength the device 550 may utilize. At operation 508, the control system 230 may cause transmission of a service fee to a service provider 580.

In some embodiments, control system 230 may receive a service provider change indication. The service provider change indication may be indicated by a message received from device 550 at operation 510*a* or service provider 580 at operation 510*b*. At operation 512, the control system 230 may identify the affected ports based on the service provider change indication. At operation 514, the control system 230 may update the port tags based on the identified affected ports. At operation 516, the control system 230 may provide a configuration command including an updated indication of message types that may be transmitted using each wavelength to the device 550.

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method for managing premise-level data communication in a wavelength division multiplexing (WDM) fiber optic network, the method comprising:
   receiving, by a control system, a message from a new device connected to the WDM fiber optic network, the message including one or more service provider identifiers, a customer identifier, and a customer equipment identifier of the new device;
   transmitting, by the control system, a configuration command to the new device, the configuration command comprising (i) an indication of which wavelengths the new device may utilize, and (ii) an indication of message types that may be transmitted using each wavelength the new device may utilize; and
   causing, by the control system, transmission of a service fee to each service provider associated with a service provider identifier of the one or more service provider identifiers.

2. The method of claim 1, wherein the message is received via a fiber optic network.

3. The method of claim 2, wherein the message is received via passive-optical networking.

4. The method of claim 1, wherein the configuration command is configured to describe up to sixteen wavelengths the new device may utilize.

5. The method of claim 1, wherein the configuration command is indicative of a wavelength that corresponds to an out-of-band control channel.

6. The method of claim 1, wherein the configuration command is indicative of up to three wavelengths that each correspond to a utility or government channel.

7. The method of claim 1, wherein the configuration command is indicative of a wavelength that corresponds to an emergency channel.

8. The method of claim 1, wherein the configuration command is indicative of a wavelength that corresponds to a spare channel.

9. The method of claim 1, wherein the configuration command is indicative of up to eleven wavelengths that each correspond to a commercial service provider channel.

10. The method of claim 1, further comprising:
    assigning, by a control system, a port tag for each port of the new device based on the one or more received service provider identifiers.

11. The method of claim 10, wherein each port tag describes a service provider identifier, a customer identifier, a customer equipment identifier, and an optical tele-toll identifier port.

12. The method of claim 10, further comprising:
    receiving, by the control system, a service provider change indication indicative of a change in service providers for the new device;
    identifying, by the control system, one or more ports the new device affected by the service provider change indication; and
    updating, by the control system, the port tag for each affected port tag of the new device.

13. The method of claim 12, further comprising:
    transmitting, by the control system, an updated configuration command to the new device, the updated configuration command comprising an updated indication of message types that may be transmitted using each wavelength the new device may utilize.

14. An apparatus for managing premise-level data communication in a wavelength division multiplexing (WDM) fiber optic network, the apparatus comprising a processor and a memory storing software instructions that, when executed by the processor, cause the apparatus to:
    receive a message from a new device connected to the WDM fiber optic network, the message including one or more service provider identifiers, a customer identifier, and a customer equipment identifier of the new device;
    transmit a configuration command to the new device, the configuration command comprises (i) an indication of which wavelengths the new device may utilize, and (ii) an indication of message types that may be transmitted using each wavelength the new device may utilize; and cause transmission of a service fee to each service provider associated with a service provider identifier of the one or more service provider identifiers.

15. The apparatus of claim 14, wherein the message is received via a fiber optic network.

16. The apparatus of claim 15, wherein the message is received via passive-optical networking.

17. The apparatus of claim 14, wherein the configuration command is configured to describe up to sixteen wavelengths the new device may utilize.

18. The apparatus of claim 14, wherein the configuration command is indicative of a wavelength that corresponds to an out-of-band control channel.

19. The apparatus of claim 14, wherein the configuration command is indicative of up to three wavelengths that each correspond to a utility or government channel.

20. A computer program product for managing premise-level data communication in a wavelength division multiplexing (WDM) fiber optic network, the computer program product comprising at least one non-transitory computer-readable storage medium storing software instructions that, when executed by an apparatus, cause the apparatus to:
   receive a message from a new device connected to the WDM fiber optic network, the message including one or more service provider identifiers, a customer identifier, and a customer equipment identifier of the new device;
   transmit a configuration command to the new device, the configuration command comprises (i) an indication of which wavelengths the new device may utilize, and (ii) an indication of message types that may be transmitted using each wavelength the new device may utilize; and
   cause transmission of a service fee to each service provider associated with a service provider identifier of the one or more service provider identifiers.

* * * * *